May 30, 1939.  J. E. OLSON ET AL  2,160,622
NUT RUNNER
Filed Dec. 31, 1936    2 Sheets-Sheet 1
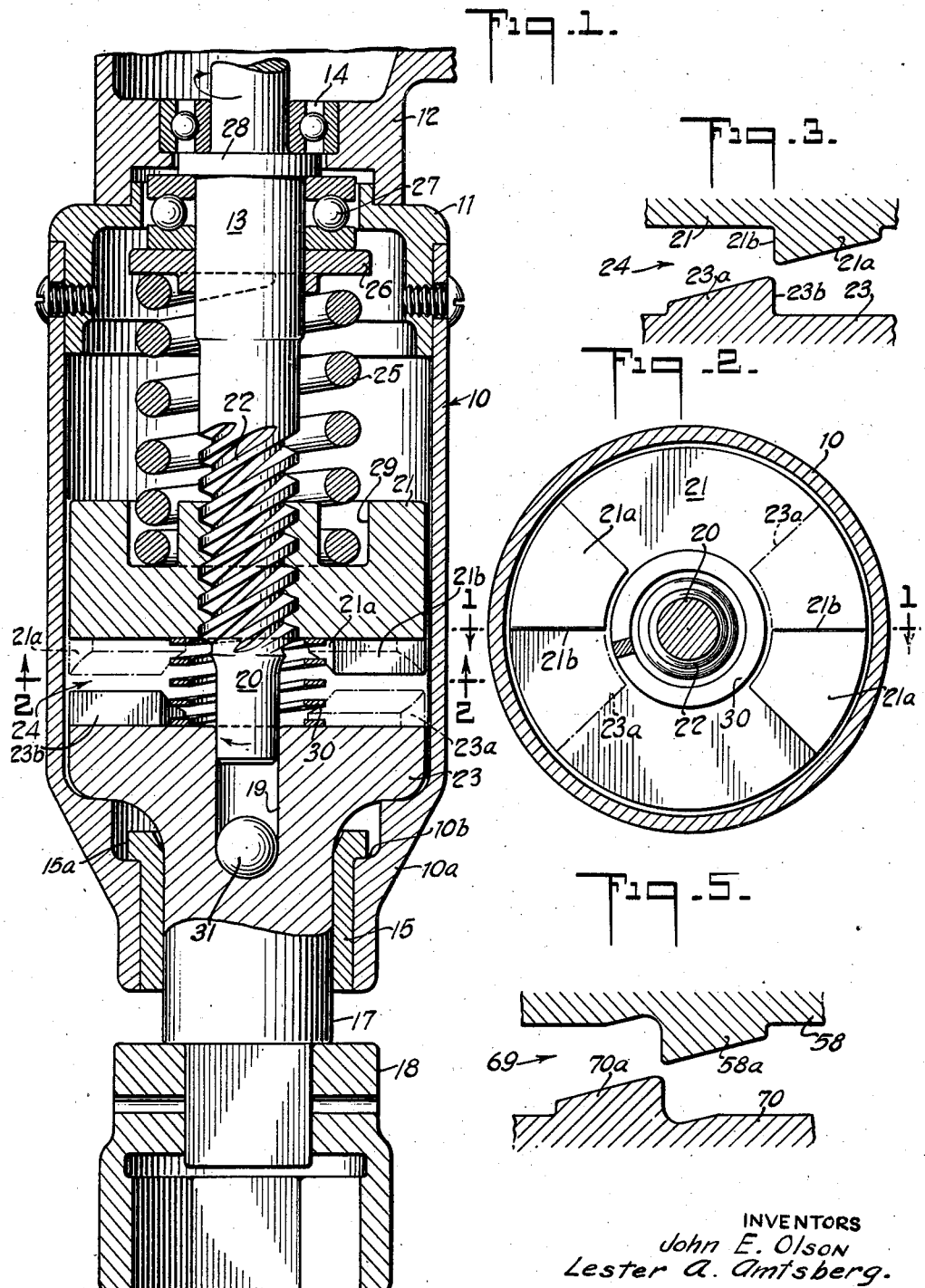
INVENTORS
John E. Olson
Lester A. Amtsberg.
BY
Raymond G. Mullee
ATTORNEY

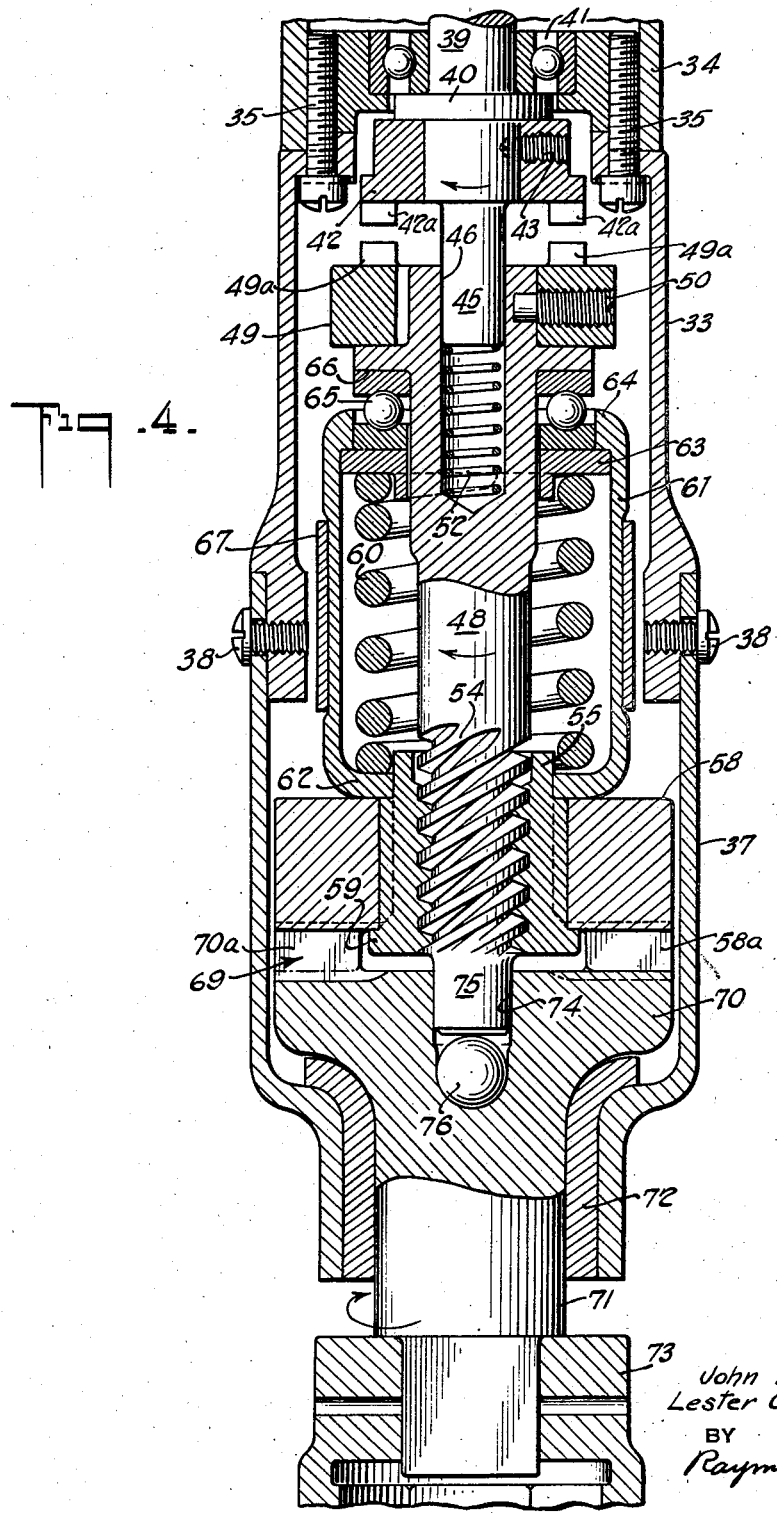

Patented May 30, 1939

2,160,622

UNITED STATES PATENT OFFICE 2,160,622

NUT RUNNER

John E. Olson and Lester A. Amtsberg, Cleveland, Ohio, assignors to Chicago Pneumatic Tool Company, New York, N. Y., a corporation of New Jersey Application December 31, 1936, Serial No. 118,443

4 Claims. (Cl. 192—30.5)

This invention relates to power apparatus for driving threaded securing elements such as screws, nuts and bolts. The invention is particularly applicable to that type of nut runner which includes an impact clutch for causing the delivery of rotatable hammer blows to the driven element.

Among the objects of the invention are to minimize the transmission of shocks from the impact clutch to the motor and gears which drive the clutch; to simplify the construction of devices of this kind; and to prolong the life of the same.

A feature of the invention resides in a screw threaded connection for driving the rotatable hammer or driving element of the impact clutch, which permits declutching movement of the hammer in response to a predetermined resistance and which cooperates with an energy accumulator to accelerate the rotation of the hammer during reclutching movement thereof.

Another object attained in the preferred embodiment of the invention, is to control the action of the impact clutch both automatically and manually. It is customary to provide a separate disconnect clutch to permit the operator to interrupt the transmission of power from the motor through the impact clutch when the nut setting operation has been completed as well as at the time the wrench socket is applied to the nut or other driven element. The disconnect clutch is particularly useful if an electric motor is employed as the prime mover since such motors do not start and stop quickly enough for mass production work. In accordance with this invention the jaws of the impact clutch are held apart by spring pressure adapted to be overcome by the pressure applied by the operator. Thus the invention obviates the necessity of a separate disconnect clutch without destroying its function.

Other objects and features of the invention will appear more clearly from the following description taken in connection with the accompanying drawings and appended claims.

In the accompanying drawings:

Fig. 1 is a longitudinal sectional view of the preferred embodiment of the invention;

Fig. 2 is a cross section as indicated by the arrows 2—2 in Fig. 1;

Fig. 3 is a fragmentary development showing the jaws or teeth on the impact clutch;

Fig. 4 is a longitudinal sectional view of a modification; and

Fig. 5 is a fragmentary development showing the jaws on the impact clutch in the embodiment of Fig. 4.

Referring to Fig. 1, the preferred embodiment of the invention comprises a housing 10 attached in any suitable manner, as by adapter 11, to a motor casing 12. A drive shaft 13, supported in a bearing 14 in the motor casing, is adapted to be driven continuously by a motor and reduction gearing (not shown). The lower end of the casing 10 tapers downwardly at 10a and provides a seat for a bearing sleeve 15 secured to the casing, as by a press fit. A flange 15a on the sleeve rests on a shoulder 10b on the casing to prevent accidental removal of the sleeve from the casing.

Sleeve 15 provides a sliding and rotatable bearing for a tool head 17. The lower end of the tool head has a square projection 17a fitting a wrench socket 18 adapted for driving a bolt or nut. The tool head 17 has a pocket 19 forming a sliding and rotatable bearing for a cylindrical projection 20 on the lower end of drive shaft 13.

A power transmission is interposed between the continuously rotating shaft 13 and the intermittently rotatable tool head 17. It comprises a rotatable impact hammer 21 having internal helical threads to receive a complementary threaded portion 22 on the shaft 13. Hammer 21 forms the driving element of an impact clutch 24, and for this purpose is provided with spaced clutch teeth 21a. Complementary clutch teeth 23a are formed on the driven element of the clutch which consists of an anvil 23 rigidly connected with the tool head 17 and preferably formed integral therewith.

A helical compression spring 25 surrounding the drive shaft 13 is arranged to push the hammer 21 forwardly or toward the anvil 23. The rear end of the spring abuts against a plate 26 seated on a ball thrust washer 27. The shaft 13 has a collar 28 confined between the thrust washer 27 and the thrust bearing 14. The front end of the spring is received within an annular groove 29 in the hammer 21, whereby to permit reduction of the length of the casing 10 and shaft 13 with relation to the length of the compression spring 25.

A disconnect spring 30 is interposed between the hammer 21 and anvil 23. Spring 30 is relatively light in comparison with spring 25 but is effective to hold the clutch teeth 21a and 23a out of engagement while the parts are in the Fig. 1 position, at which time the spring 25 is not under sufficient pressure to overpower the disconnect spring 30. In order to engage the clutch teeth 21a and 23a, the operator presses socket 18 against the nut or bolt to move the socket, tool head 17, and anvil 23 rearwardly with respect to the casing 10 and shaft 13, until the ball 31 seats against the end of shaft 13.

Assuming that the parts are in the position shown in Fig. 1 with the drive shaft 13 rotating continuously in a clockwise direction (looking forwardly), the operation is as follows: Clutch teeth 23a are manually forced into and held in engagement with the teeth 21a on the driving element 21 of the impact clutch 24. The tool head 17 is thereby caused to rotate in unison with the drive shaft 13. The torque delivered by drive shaft 13 to the hammer 21 is resolved into a rotary component and an axial component tending to move the hammer 21 rearwardly. Normally, the tendency for the hammer 21 to move in a declutching direction is overcome by the pressure of spring 25. When the driven nut or bolt becomes seated and the resistance to rotation of the tool head 17 exceeds a predetermined torque, there is a corresponding increase in the axial component of force delivered to the hammer 21 by the screw threads 22 which is sufficient to cause the hammer to move out of engagement with the anvil 23. Rearward movement of the hammer 21 compresses the spring 25 and stores energy therein. The disengagement of the teeth 21a and 23a of the impact clutch 24 momentarily releases hammer 21 for rotation independent of the anvil 23 and, during the same interval, relieves the hammer 21 from the rearward axial component of force. The hammer rotates 180° ahead of the anvil and strikes the succeeding set of jaws on the anvil due to the fact that the spring 25 reengages the impact clutch 24 during the free movement of the hammer. It will be understood that axial movement of the hammer 21 with respect to the drive shaft 13 is accompanied by relative rotary movement. While the hammer is moving rearwardly, it rotates at a lesser speed than the shaft 13 and, conversely, during the forward or reengaging movement of the hammer, it is accelerated relatively to the shaft 13 by the combined action of the spring 25 and screw threads 22. The speed of the hammer at the instant of impact with the anvil 23 is greater than the speed of the driving shaft 13. Thus the spring 25 acts as an energy accumulator in storing energy during the declutching movement of the hammer and releasing such energy during the reclutching movement to accelerate the hammer.

As shown in Figs. 2 and 3 the impacting surfaces 21b and 23b of the teeth 21a and 23a are arranged in planes which pass through the axis of the rotating shaft 13. These teeth slope with respect to the impact surfaces so that the spring 25 may start moving the hammer 21 toward reengagement with the anvil 23 the instant that the hammer is released for rotation relative to the anvil.

The continued rotation of the drive shaft 13 causes the delivery of a succession of impacts by the hammer 21 against the anvil 23 until the operator releases the rearward axial pressure against the disconnect spring 30 to permit the hammer to rotate continuously independent of the anvil.

In a modified embodiment of the invention the manually controlled disconnect clutch and the automatically operable impact clutch are separate. Referring to Figs. 4 and 5, the modification comprises a housing consisting of a rear section 33, secured to the motor casing 34 by bolts 35, and a front housing section 37 attached to the rear section by bolts 38. Continuously rotating shaft 39, driven by a pneumatic, electric, or other suitable motor (not shown) projects from the motor casing 34 into the rear housing section 33. Rotating shaft 39 has a collar 40 whose rear face abuts against bearing 41. The front face of the collar 40 engages a clutch plate 42 secured to the shaft by one or more studs 43. Shaft 39 has an extension 45 received within a recess 46 in a drive shaft 48, said shafts having a sliding and rotating fit. A driven clutch plate 49 is secured to shaft 48 by one or more studs 50. Clutch plates 42 and 49 have cooperating clutch teeth 42a and 49a respectively and constitute a manually operable disconnect clutch for a purpose hereinafter set forth. A spring 52 in the recess 46 provides yieldable means for holding clutch plates 42 and 49 apart.

The drive shaft 48 is provided near its front end with a threaded portion 54 cooperating with a nut 55. The exterior surface of the nut is non-circular, preferably hexagonal, and fits within a hammer 58. A flange 59 at the front end of the nut limits forward movement of the hammer with respect to the nut. A spring 60, surrounding the drive shaft 48, urges the nut and hammer forwardly with respect to the shaft 48. The spring is under considerable initial compression and, in order to prevent it from overpowering spring 52, a split retainer 61 is provided. Retainer 61 has an inwardly extending flange 62 at its front end which is interposed between spring 60 on one side and nut 55 and hammer 58 on the other side. The rear end of the spring engages washer 63 which normally seats against an inwardly extending flange 64 on the rear end of the retainer 61. When the spring 60 is further compressed, the upward pressure on the washer 63 is taken by a ball thrust washer 65 seated on a shoulder 66 provided on the drive shaft 48. A ring 67 holds the sections of the split retainer 61 in assembled relation.

Hammer 58 forms the driving element of an impact clutch 69 and for this purpose is provided with spaced teeth 58a. The driven element of the clutch consists of an anvil 70 having teeth 70a cooperating with driving teeth 58a. Anvil 70 has an extension 71 constituting a tool head and having a sliding and rotating fit with a bearing 72 carried by the front end of housing section 37. A socket 73 is fixed to the end of the tool head for driving a bolt or nut (not shown).

The anvil 70 has a recess 74 rotatably receiving an extension 75 on the front end of drive shaft 48. A ball 76 at the bottom of the recess 74 receives the downward thrust of the drive shaft resulting from spring 52.

The operation of the modification shown in Figs. 4 and 5 is as follows: Shaft 39 and driving plate 42 of the disconnect clutch rotate continuously in a clockwise direction but are disconnected from the elements in front of shaft 39 until the operator presses socket 73 against the nut or bolt to be driven. Axial pressure of the socket 73 rearwardly of the housing 33, 37 is transmitted through the tool head 71, ball 76 and drive shaft 48 to force the plate 49 into driving engagement with plate 42 of the disconnect clutch, whereupon shafts 39 and 48 rotate in unison. Shaft 48 carries, in its rotation, nut 55, hammer 58, anvil 70, tool head 71 and socket 73. The torque transmitted by the shaft 48 to nut 55, is resolved into a rearward axial, as well as a rotary component, but the axial component of force is ordinarily overpowered by spring 60 which tends to hold the elements of the impact clutch 69 engaged. When the socket 73 meets with increased resistance offered by the driven elements, there is a corresponding increase in the axial component of force exerted on nut 55 by threaded portion 54, which force increases until it overpowers spring 60 and moves nut 55 and hammer 58 rearwardly.

Rearward movement of the hammer 58 is effective to disengage the impact clutch 69 thereby freeing the hammer, nut 55 and drive shaft 48 for rotation independently of the anvil 70, and also to release the rearward axial thrust on nut 55. After the driving engagement between impact clutch teeth 58a and 70a has been broken, the spring begins to move the hammer 58 toward reengagement with the anvil 70. The impact clutch 69 is thus automatically disengaged and reengaged to cause the hammer 58 to cause successive impact blows against the anvil. The hammer preferably has a large moment of inertia which results in the delivery of powerful blows.

Due to the helical formation of the threads 54, the drive shaft 48 rotates ahead of the hammer 58 while the hammer is moving rearwardly and, conversely, the hammer speeds up to overtake the drive shaft while it is moving forwardly. Thus, energy is stored in the spring 60 while it is being compressed, such energy being subsequently released to accelerate the hammer 58.

The torque required for releasing the impact clutch in either illustrative embodiment of the invention may be predetermined by a proper selection of the angle of the threads on the drive shaft and the force of the accumulator spring.

While the invention has been described with reference to impact wrenches operable in a clockwise direction of rotation, it will be understood that the invention is equally applicable to machines rotating in a counterclockwise direction. To reverse the direction of rotation, the drive shaft should be provided with a left-hand thread, and the teeth of the impact clutches modified accordingly in a manner well understood to those skilled in the art. It is apparent that further modifications and adaptations of the illustrative embodiments of the invention may be made without departing from the spirit of the invention or the scope of the appended claims.

What is claimed is:

1. A rotary impact tool comprising a drive shaft having helical screw threads formed on and extending around its periphery, a clutch driving plate of substantial mass surrounding the shaft and having internal screw threads complementary to those first mentioned, a clutch driven plate, said plates having complementary interengageable teeth separated by spaces permitting lost motion of the driving plate after disengagement from and prior to reengagement with the driven plate, means for rotating the shaft in a direction to cause the screw threads to impart an axial force to the driving plate tending to separate said plates, a spring urging the driving plate toward engagement with the driven plate, a casing enclosing said drive shaft, clutch plates and spring, said driven clutch plate being mounted for limited axial movement relative to the casing, and a relatively light spring urging the driven plate axially in a direction to interrupt the transmission of power to said driven plate, the last-mentioned spring being adapted to be overcome by manual pressure applied to the driven plate.

2. An impact tool comprising a drive shaft, a rotatable impact hammer, a torsionally resilient connection between the shaft and the hammer, an anvil rigidly connected to a tool head, said shaft having a sliding and rotatable bearing in the anvil, said hammer and anvil having complementary clutch teeth separated by spaces permitting lost motion of the hammer relative to the anvil upon interruption of the driving connection, said torsionally resilient connection comprising torque responsive means for automatically moving the hammer away from the anvil, and manually controlled means for holding the hammer out of engagement with the anvil, said last-mentioned means comprising a relatively light disconnect spring surrounding said shaft and interposed between the hammer and anvil and adapted to be overcome by movement of the tool head and anvil toward the hammer.

3. An impact tool according to claim 2 in which said clutch teeth have driving surfaces located in planes coaxial with the drive shaft.

4. An impact tool comprising an impact clutch having a driving and a driven plate separable by relative axial movement therebetween; a tool head rigidly connected with the driven plate; a rotatable impact hammer rigidly connected with the driving plate; a rotatable drive shaft; a torsional elastic connection between said shaft and said hammer, said torsional elastic connection comprising a spring surrounding the drive shaft and urging the hammer toward the clutch driven plate, and a screw threaded connection between the shaft and hammer, the lead angle of the threads permitting rotative movement of the hammer in response to axial pressure; and a relatively light disconnect spring surrounding said shaft and interposed between the hammer and plate, said last named spring urging the hammer and plate apart and adapted to be overcome by manual pressure applied to the tool head.

JOHN E. OLSON
LESTER A. AMTSBERG.